UNITED STATES PATENT OFFICE.

THOMAS SPENCER, OF SYRACUSE, NEW YORK.

IMPROVEMENT IN SALTING MEATS.

Specification forming part of Letters Patent No. 36,735, dated October 21, 1862.

*To all whom it may concern:*

Be it known that I, THOMAS SPENCER, of Syracuse, Onondaga county, and State of New York, have invented a new and useful Improvement in the Process of Salting Meats; and I do hereby declare that the following is a full, clear, and exact description of my said invention.

Most of the ordinary salt of commerce is impure, the crystals or grains being coated on the outside with chloride of magnesium and the chloride of calcium, which have deliquescent properties, and which, when used for salting meat, impart a bitter and pungent taste, and otherwise injure it; and as the said impurities have deliquescent properties, and they coat the outer surface of the crystals, by exposure they take up moisture from the atmosphere and run, thus gradually leaving the salt in purer state, and for that reason foreign salt is generally more pure than domestic salt, unless the latter be kept a sufficient length of time exposed to the atmosphere. The Government of the United States for that reason, in their purchases, require the meats to be salted with foreign salt, and much of the meat salted in the west, where native salt is generally used, on reaching the Atlantic coast is repacked with foreign salt, to avoid in part the injurious effects of the impurities in question.

The object of my said invention is to avoid the evil consequences heretofore experienced in the use of impure salt in salting and packing meats.

I take the ordinary American salt—such as the Onondaga salt, or any other salt having the like impurities—and from this I make the brine required for what is termed the "pickle," and of the required strength, as is well known to persons acquainted with the process of curing meats. This I do by putting such salt in a vat in quantity equal to what is required for salting and making the pickle for a given quantity of meat, and I pour water onto it and draw it off from the bottom of the vat. As the impurities in question are deliquescent salts—such as the chloride of magnesium or of calcium in the form of a coating on the crystals or grains of salt—the water, in dissolving a portion of the salt, will first dissolve the deliquescent salts, and I draw off the water at the degree of saturation required to form the pickles, the degree of saturation being well known. The salt remaining in the vat will be pure, the deliquescent salts or impurities having been dissolved and carried off by the process of making the pickle, and being in a purified state. Such salt I then use for "packing" the meat, as it is termed. The brine thus produced in the process of purifying the quantity of salt required for packing contains the deliquescent salts in solution, and if used in that condition as a brine would have the same injurious effect upon the meat as if the impure salt had been directly used. To avoid this I neutralize these deliquescent salts by putting into the brine an equivalent of carbonate of soda. The proportion of this ingredient cannot be given for all cases, as the proportion of deliquescent salts present differs in salt obtained from different localities and with the length of exposure to the atmosphere. For new Onondaga salt about two pounds of dry carbonate of soda to a thousand pounds of salt will be a good proportion. It is well known that the proportion of deliquescent salts in any sample of salt can be readily ascertained, and when ascertained the quantity of soda can be proportioned by the known law of equivalents. I stir the mass to insure the action of the ingredients by which the said deliquescent salts are neutralized, and after this I let it rest a sufficient length of time—about twenty-four hours—to permit the substances produced by the chemical action to precipitate, and then draw off the brine thus prepared and use it for the meat with as good effect as if it had been made from pure salt.

By the foregoing process I am enabled to salt meats as perfectly as with the purest salt, and with cheap salt which could not otherwise be successfully used for this purpose; and although I have named carbonate of soda as the substance which may be used successfully to neutralize the deliquescent salts present in the brine, I have only named this substance because I have tried it with success and believe it to be best; but any other known chemical equivalent may be substituted.

What I claim as my invention, and desire to secure by Letters Patent in the process of curing meat, is—

Making the brine by washing the salt to be used for packing, and thereby removing therefrom the deliquescent salts, and then neutralizing the deliquescent salts in the brine, substantially as and for the purpose herein described.

THOS. SPENCER.

Witnesses:
PETER DE LACY,
A. DE LACY.